Jan. 8, 1924. 1,479,814
D. G. JACKSON
SKIVING MACHINE
Filed Dec. 24, 1921
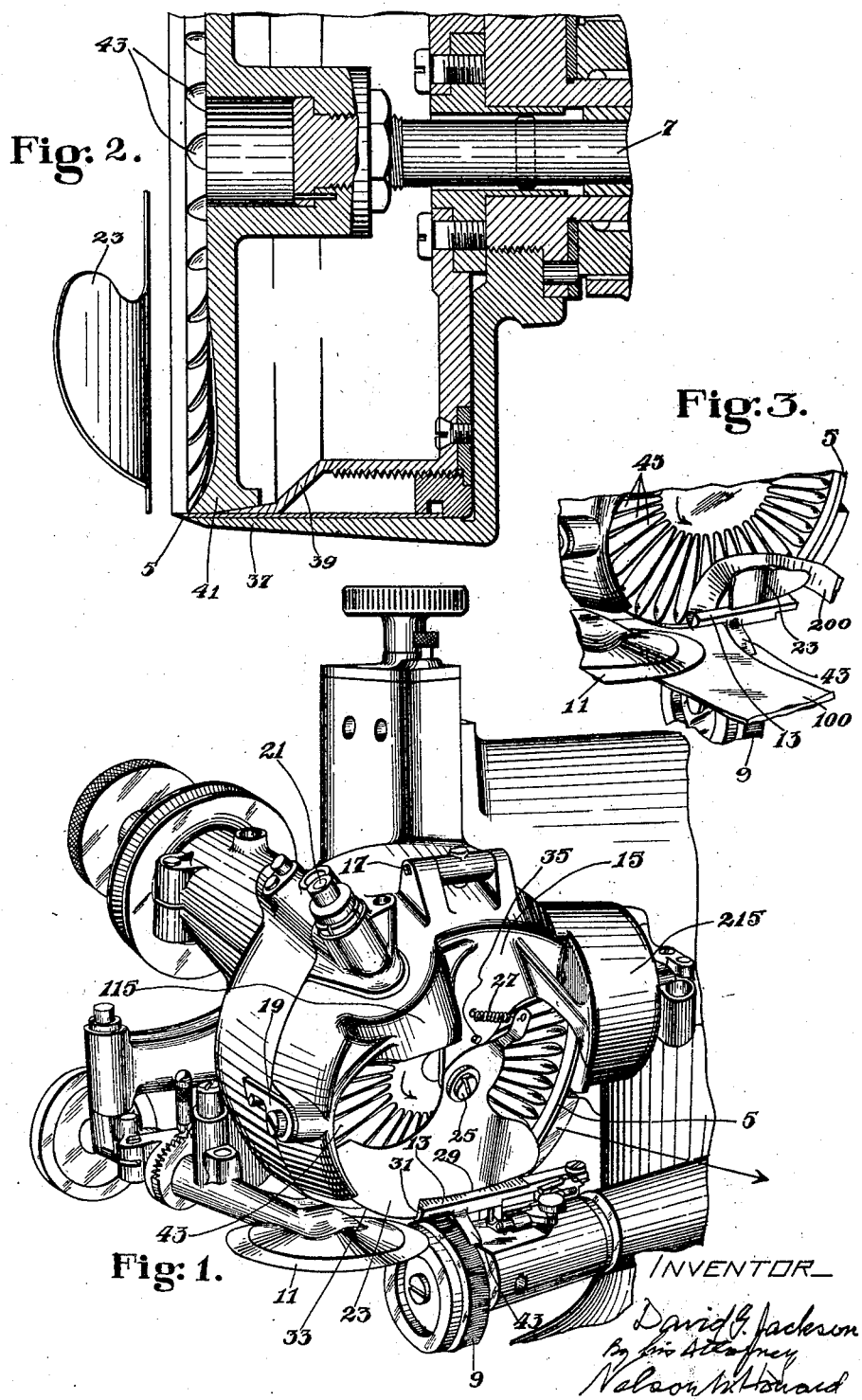

Patented Jan. 8, 1924.

1,479,814

UNITED STATES PATENT OFFICE.

DAVID G. JACKSON, OF BEVERLY, MASSACHUSETTS, ASSIGNOR TO UNITED SHOE MACHINERY CORPORATION, OF PATERSON, NEW JERSEY, A CORPORATION OF NEW JERSEY.

SKIVING MACHINE.

Application filed December 24, 1921. Serial No. 524,674.

*To all whom it may concern:*

Be it known that I, DAVID G. JACKSON, a citizen of the United States, residing at Beverly, in the county of Essex and State of Massachusetts, have invented certain Improvements in Skiving Machines, of which the following description, in connection with the accompanying drawings, is a specification, like reference characters on the drawings indicating like parts in the several figures.

This invention relates to skiving machines and is herein illustrated as embodied in a machine for skiving pieces of upper leather in the manufacture of boots and shoes.

Commonly in such machines the knife is mounted upon a rotary shaft, and the leather is fed to the knife by a roll, the leather being held down upon the roll by a presser foot. A difficulty has arisen in the use of such machines by reason of the fact that the dust and chips which result from the skiving operation have interfered in various ways with the desired operation of the machines. For example, the longer chips may curl in such a manner as to work under the presser foot, or they may become wound about some rotary part of the machine, or the smaller chips and the dust may be carried between moving parts of the machine which are close together and interfere with their operation. The general object of the present invention is to carry away the chips and dust as soon as they have been formed and expel them from the machine, thereby preventing them from collecting in localities in which they would interfere with the proper operation of the machine.

According to one feature of the present invention, a moving member is provided for removing the chips and dust. In the illustrated machine in which a cylindrical knife is shown, a clamping member which is located inside the knife holder and forces the knife against the knife holder so as to maintain it firmly in place is provided with a series of radial grooves or corrugations. The clamping member so grooved acts as a fan to blow the dust and chips away from the locality in which the skiving takes place; and has also a mechanical action in that the edges of the grooves catch the chips more or less and throw them to one side, this action being particularly effective on the longer chips.

This and other features of the invention including certain details of construction and combinations of parts will be described as embodied in an illustrated machine and pointed out in the appended claims.

Referring to the accompanying drawings,

Figure 1 is a perspective of a skiving machine in which the present invention is embodied;

Fig. 2 is a vertical longitudinal cross-section through a portion of the knife-holder and knife, the deflector being shown in full lines, and Fig. 3 is a perspective of a portion of the machine showing more particularly how a chip is deflected and carried away.

The machine shown is in a general way like that shown in the patent to Alexander 1,169,060. It comprises a cylindrical knife 5 fastened to the outer end of a rotary shaft 7 which is inclined upwardly in the direction of the feed of the work. A rotary feed roll 9 and a cooperating feed disk 11 feed the work to the knife; and a presser-foot 13 holds the work down upon the roll. These parts and the mechanism for driving the knife, roll and disk are, or may be, substantially the same as those described in the patent, and, since the details of their construction form no part of the present invention, no further description of them will be given.

In the present machine a guard 15, pivoted at 17 to a stationary part of the machine covers all but the lower portion of the edge of the knife, said guard being held in operative position by a latch 19, such a construction permitting the guard to be swung upwardly about the pivot 17 at any time to give access to the knife. Two grinders for the knife are provided both of which are also covered by the knife guard. The inside grinder, the stem of which is shown at 21, is covered by the portion 115 of the guard 15, and the outside grinder is covered by the portion 215, said grinders being adapted to bevel the outside edge of the knife and to remove the burr from the inside of the knife. The grinders are normally spaced slightly from the edge of the knife but may be moved into engagement with the knife edge when desired.

In the operation of the machine as thus far described, with the knife rotating in the direction indicated by the small arrows in Fig. 3, two difficulties, among others, have arisen with regard to the chips and dust formed during the skiving operation. In the first place, chips, particularly long ones, have tended to curl back over the top of the presser foot 13 and to enter beneath the presser-foot and the work. In the second place, both chips and dust have collected in objectionable quantities in the vicinity of the outside grinder, which is covered by the portion 215 of the knife guard, and to become wedged between the grinder and the rotating knife and knife holder.

In order to do away with the objectionable curling out of the chips over the presser foot, the machine is provided with a chip deflector. The deflector comprises a plate 23 of the shape shown in the figures which is pivoted at 25 to the knife guard 15 and is urged at all times in a counterclockwise direction by a tension spring 27. The lower edge of the deflector has a substantially horizontal portion 29, which lies close to the top of the presser-foot 13, a substantially vertical portion 31 which contacts with the outer end of the presser-foot, and a curved portion 33 which covers the edge of the knife between the outer end of the presser-foot and the adjacent end of the knife guard 15. The vertical portion 31 of the lower edge of the deflector 23, by contacting with the outer end of the presser-foot, limits the angular movement of the deflector due to the pull of the tension spring 27. In other words, the outer end of the presser-foot serves as a stop to position the deflector properly. When the knife guard 15 is raised about its pivot 17, the deflector is, of course, disengaged from the presser-foot; and, if no further provision were made, the deflector would be swung far to the right, as viewed in Fig. 1. To prevent this, a small pin 35 is driven into the guard 15 in position to engage an adjacent edge of the deflector 23 so as to limit its swinging movement to the right. The main portion of the deflector 23 lies in a plane which is substantially perpendicular to the axis of the knife shaft 7; but the lower right-hand portion, as viewed in Fig. 1, curves outwardly so as to permit the chips and dust to escape.

The knife 5 is a thin blade of steel bent into the form of a hoop and is mounted between the inner face of a cylindrical holder 37 and the outer face of a slotted expansion member 39. A clamping member 41 having a dished outer face is adapted when adjusted inwardly relatively to the knife holder 37 to expand the member 39 and thereby hold the knife rigid with the holder. During the operation of the machine, the holder, expansion member, knife and clamping member are rotated rapidly by the shaft 7 to which they are then rigidly held. In order to produce a current of air so as to carry the chips and dust away from the cutting point and out of the machine, as well as to provide rigid means for engaging the chips and dust for the same purpose, the exposed face of the clamping member 41 is provided with a series of radial grooves or corrugations 43.

In the operation of the machine the work is fed to the knife in a direction substantially parallel to the axis of rotation of the knife, the work being guided by contact of its edge with an edge gage 43 which is rigid with the presser-foot 13. The finished work passes beneath the knife, and the chips pass over said edge, in the illustrative machine, into the interior of the cylindrical knife. The deflector 23, by reason of its location and shape, prevents the chips from curling out over the presser foot but permits them to pass out from the knife at a locality just to the right of the presser-foot. The deflector also serves to confine the chips momentarily between itself and the face of the clamping member 41. This member 41, grooved or corrugated as shown, acts as a fan to blow the chips and dust away from the cutting point and out of the machine in the approximate direction indicated by the large, straight arrow in Fig. 1. Its corrugations also act mechanically, by engagement with the larger chips, to expel them in the same path. In Fig. 3 a piece of work 100 is being skived, the chip or skiving being indicated at 200. In this case the deflector directs the skiving against the corrugations of the member 41, the skiving being bent to the right by the rotation of said member and expelled from the machine. The action of the rotating chip remover is partly direct by engagement with the chips and partly indirect by causing a current of air to flow through the channel between the rotating chip remover and the stationary deflector.

Although the invention has been described for convenience as embodied in a skiving machine having a cylindrical knife, it should be understood that the refuse matter resulting from skiving leather and other sheet material causes disadvantageous results in other types of skiving machines and that the invention is not limited in the scope of its application to the particular machine or type of machine which has been shown and described.

Having thus described my invention, what

I claim as new and desire to secure by Letters Patent of the United States is:—

1. A machine of the class described having, in combination, a cylindrical skiving knife, means for rotating the knife, means for feeding material to the knife to be skived, and a fan located inside the knife and rotating therewith for expelling the resulting chips.

2. A machine of the class described having, in combination, a knife blade of circular form, a cylindrical holder open at one end only in which the blade is mounted, a clamping member for holding the blade rigid with the holder, said clamping member having a corrugated exposed face for ejecting the chips from the open end of the knife holder, and means for feeding material to the knife.

3. A machine of the class described having, in combination, a rotary skiving knife, means for feeding material to the knife, a moving chip remover and a deflector between which and the chip remover the chips which result from the skiving operation pass.

4. A machine of the class described having, in combination, a rotary skiving knife, means for feeding material to the knife, a rotary chip remover, and means for directing against the remover the chips which result from the skiving operation.

5. A machine of the class described having, in combination, a cylindrical skiving knife having an open end, means for rotating the knife, means for feeding the work to the open end of the knife, and a dish-shaped chip remover located within the knife, said remover being fast to the knife so as to rotate therewith and being provided with radial corrugations.

6. A machine of the class described having, in combination, a cylindrical skiving knife having an open end, means for rotating the knife, means for feeding the work to the open end of the knife to be skived, and a corrugated dish-shaped member rigidly held within the knife and adapted to expel the resulting chips from said open end of the knife.

7. A machine of the class described having, in combination, a rotary cylindrical knife, a guard adapted to cover all but the lower portion of the edge of the knife, a feed roll and a presser foot for directing the work to the lower portion of the edge of the knife, a chip deflector located adjacent the roll and foot, and a cooperating rotary chip remover located within the knife.

8. A machine of the class described having, in combination, a rotary cylindrical knife, a guard adapted to cover all but the lower portion of the edge of the knife, a feed roll and a presser foot for directing the work to the lower portion of the edge of the knife, a chip deflector located adjacent the roll and foot, and a cooperating rotary chip remover having radial corrugations located within the knife.

In testimony whereof I have signed my name to this specification.

DAVID G. JACKSON.